(12) United States Patent
Shoemaker, Jr.

(10) Patent No.: US 9,818,265 B1
(45) Date of Patent: Nov. 14, 2017

(54) CAMERA GUIDED ARCADE GAME

(71) Applicant: Stephen P. Shoemaker, Jr., Redondo Beach, CA (US)

(72) Inventor: Stephen P. Shoemaker, Jr., Redondo Beach, CA (US)

( * ) Notice: Subject to any disclaimer, the term of this patent is extended or adjusted under 35 U.S.C. 154(b) by 0 days.

(21) Appl. No.: 15/478,551

(22) Filed: Apr. 4, 2017

Related U.S. Application Data

(63) Continuation-in-part of application No. 15/285,451, filed on Oct. 4, 2016, now abandoned.

(51) Int. Cl.
| | |
|---|---|
| *G07F 17/32* | (2006.01) |
| *A63F 9/30* | (2006.01) |
| *A63F 9/00* | (2006.01) |
| *A63F 9/24* | (2006.01) |
| *G07F 17/34* | (2006.01) |
| *H04N 5/232* | (2006.01) |
| *G06F 3/01* | (2006.01) |

(52) U.S. Cl.
CPC ........ *G07F 17/3297* (2013.01); *A63F 9/0079* (2013.01); *A63F 9/24* (2013.01); *A63F 9/30* (2013.01); *G06F 3/016* (2013.01); *G07F 17/3246* (2013.01); *G07F 17/3248* (2013.01); *G07F 17/3262* (2013.01); *G07F 17/34* (2013.01); *H04N 5/23293* (2013.01); *A63F 2009/0081* (2013.01); *A63F 2009/2407* (2013.01); *A63F 2009/2457* (2013.01); *A63F 2009/2458* (2013.01); *A63F 2009/2461* (2013.01); *A63F 2250/144* (2013.01)

(58) Field of Classification Search
CPC .. A63F 9/0079; A63F 2009/0081; A63F 9/24; A63F 2009/2407; A63F 2009/2457; A63F 2009/2458; A63F 2009/2461; A63F 2250/144; A63F 9/30; G07F 17/32; G07F 17/3246; G07F 17/3248; G07F 17/3262; G07F 17/34; G06F 3/016; H04N 5/23293
See application file for complete search history.

(56) References Cited

U.S. PATENT DOCUMENTS

| | | | | |
|---|---|---|---|---|
| 4,778,176 | A * | 10/1988 | Shoemaker, Jr. | ......... A63F 9/30 212/225 |
| 5,855,374 | A * | 1/1999 | Shoemaker, Jr. | ....... G07F 17/32 273/447 |
| 5,967,892 | A * | 10/1999 | Shoemaker, Jr. | ......... A63F 9/30 273/448 |
| 6,234,487 | B1 * | 5/2001 | Shoemaker, Jr. | ......... A63F 9/30 273/447 |
| 2007/0114725 | A1 * | 5/2007 | Peck | ......................... A63F 9/30 273/447 |
| 2009/0191931 | A1 * | 7/2009 | Peck | ....................... G07F 17/32 463/7 |
| 2009/0267302 | A1 * | 10/2009 | Fukazawa | ................. A63F 9/30 273/447 |
| 2011/0180998 | A1 * | 7/2011 | Verstraeten | ............... A63F 9/30 273/447 |

FOREIGN PATENT DOCUMENTS

GB             2448337 A   *   10/2008   ............... A63F 9/30

* cited by examiner

*Primary Examiner* — Raleigh W Chiu
(74) *Attorney, Agent, or Firm* — Fulwider Patton LLP

(57) ABSTRACT

An arcade game with that allows a player to control the game using a video feedback plus a tactile response is provided. A player must use the video feed for controlling the game, and the video feed can be altered to vary the difficulty of the game. The tactile response can also be controlled to provide a more realistic game experience to the player.

9 Claims, 8 Drawing Sheets

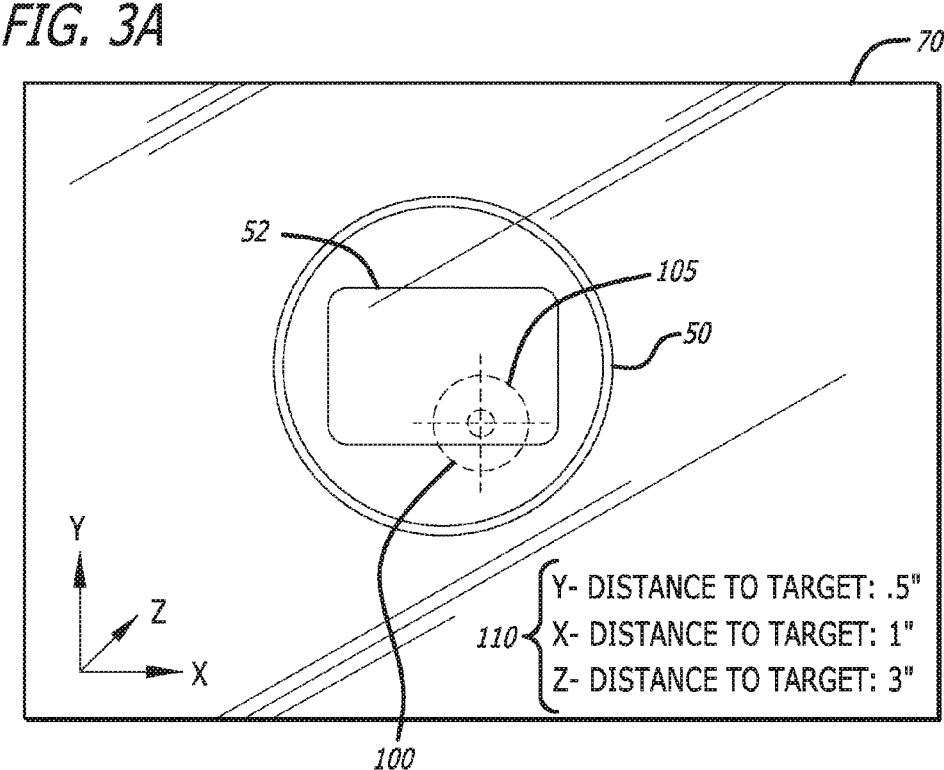

CAMERA GUIDED ARCADE GAME

CROSS-REFERENCE TO RELATED APPLICATION

This is a continuation-in-part application of U.S. Ser. No. 15/285,451, filed Oct. 4, 2016, which is incorporated by reference in its entirety.

BACKGROUND

Arcade games come in many types, shapes, and sizes. One popular type of arcade game is a crane game where a player manipulates a crane hovering above a collection of targets and attempts to pick up a target, such as a prize, and withdraw the target to a collection bin. The crane can be a mechanical claw type game or a vacuum pick-up device, and the prizes can vary from plush toys to prizes to gift cards and the like. The crane game is one of the most popular types of arcade games and manufacturers of crane games are always looking for ways to make the game more interesting and challenging for players. One way to expand the way crane games are played is to vary the perspective of the player from the traditional view a player ordinarily possesses. The present invention is a new variation on the traditional crane game, where the player can take a new perspective while playing the game and also allow spectators to share in the excitement of playing the crane game with the player.

SUMMARY OF THE INVENTION

The present invention is an arcade game enclosed in an opaque housing such that the player cannot see the playing field with the naked eye. Rather, the player must rely on both his/her tactile response and a camera within the housing that provides visual feedback to the player within the housing. The visual feedback can be varied to increase the difficulty of the game, such as with a strobe effect, with an altered perspective such as a distorted, irregular, or inverted view of the game, or with a myriad of other ways to change the player's perception of the game. The visual feedback is provided by a camera mounted inside the game so as to allow the player to operate the controls, such as for example on a crane in a crane-type arcade game. The camera feeds a video signal to either a monitor or a headset/glasses to give the player feedback on the progress of the game. The player also has tactile feedback from the controls, such as the tactile feedback that the crane provides from contact with a target or other feedback from the game itself. The visual feedback from the camera plus the tactile feedback provides a bounty of possibilities for new games that are open to players simply by altering the video feedback of the original game.

These and other features of the invention may be best understood with reference to the accompanying figures and the detailed description of the invention below.

BRIEF DESCRIPTION OF THE DRAWINGS

FIG. 3A is an illustration of a display from the camera showing a target and information from the pick-up device;

FIG. 3B is an illustration of a display message to the player after a successful attempt to pick up a target;

DETAILED DESCRIPTION OF THE PREFERRED EMBODIMENTS

Figure 1:
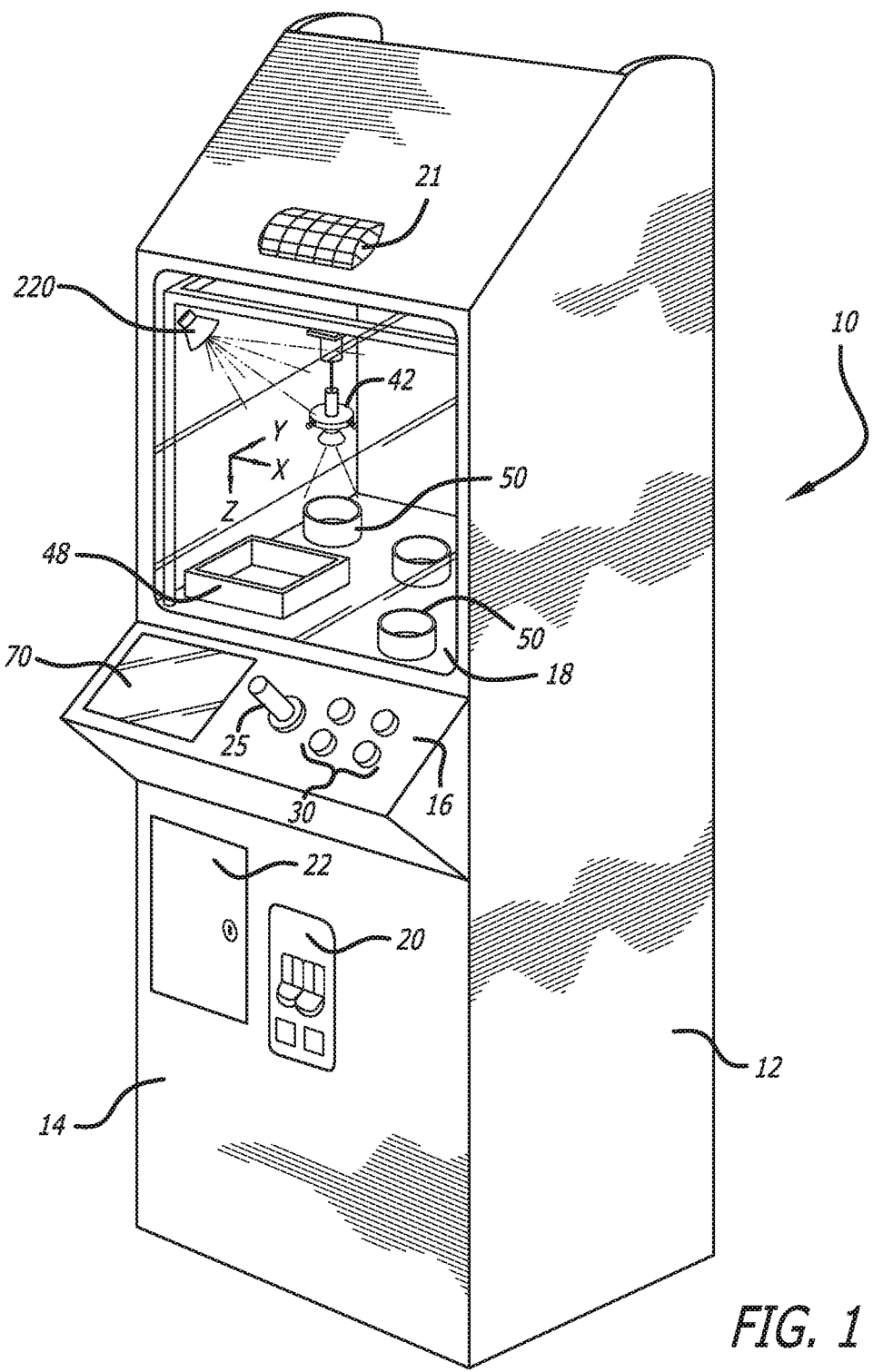
FIG. 1 is an elevated perspective view of a first preferred embodiment of the present invention.

A first preferred embodiment of the present invention is illustrated in FIG. 1. FIG. 1 illustrates an arcade crane game, which may use a vacuum extraction device such as that described in U.S. patent application Ser. No. 14/838,980 entitled "Vacuum Crane Game," by the present inventor, the contents of which are fully incorporated herein by reference. Alternatively, the game may use other pick-up devices such as a mechanical claw, magnetic, electromagnetic, hook and loop fastener, or other type of pick-up mechanism. The game apparatus 10 includes a housing 12 with a front panel 14. The housing can take a wide variety of forms, for example, as shown in FIG. 1, housing 12 may be of a rectangular configuration where players stand up to play, or there can be other versions in which a player sits on a stool when playing the game. In other embodiments, other types of housings may be provided. For example, a counter-top housing, including approximately the upper half of housing 12 shown in FIG. 1, can be used when the game apparatus 10 is desired to be placed on a table, counter top or other similar surface.

Front panel 14 includes a player control panel 16 that includes player controls 30. Front panel 14 includes a coin deposit slot 20, and a speaker 21 may also be provided on the housing 12. Coin deposit slot 20 may be more generally thought of as a payment area, where the game can accept payment in the form of currency, coins, game tokens, bills, tickets, and the like. In some embodiments, other types of monetary input may also be provided using a magnetic card reader to read a card with a magnetic strip that holds game credit information, or a bank card such as a credit card, debit card, etc. A token deposited in coin deposit slot 20 (or other payment method) starts a game. Dispenser compartment 22 is used to provide access to the retrieval bin in the event of a successful attempt by the player.

The front panel 14 can also include other features if appropriate. Player control panel 16 allows a player to manipulate events in the game, such as a forward and backward button to control the movement of the extraction device 42 in the two dimensional X-Y plane, which can also be controlled by a joystick 25, roller ball, touchscreen, or other input device. At the bottom of the playing area 18 is a plurality of cylindrical columns or silos 50, which may have different heights and diameters. Each silo 50 houses a stack of targets, such as gift cards. The target area formed by the silo wall is dimensioned so as to be slightly larger than the largest dimension (e.g., a diameter) of the extraction device 42. Thus, only by precisely hovering the extraction device 42 over the silo's target area can the player successfully lower the extraction device into the silo 50 to collect a gift card 51. If the target is extracted by the pick-up device 42, it is automatically moved over the collection bin 48 which leads to the dispenser compartment 22 accessible by the player.

Located on the front panel 14 is a display 70, which may be any type of display such as LED, LCD, Projection, etc., from which an image can be displayed. The image displayed on the display 70 is a live feed from a camera 80 on the pick-up device pointing downward toward the targets. The camera 80 gives the player a view of the target from above that is not available in other arcade games and presents new challenges and opportunities for the player to experience and learn from. The player can simultaneously view the pick-up device through the window on the housing 12 and the display 70 to improve the opportunity to successfully pick up the target using the pick-up device 42.

Figure 2A:
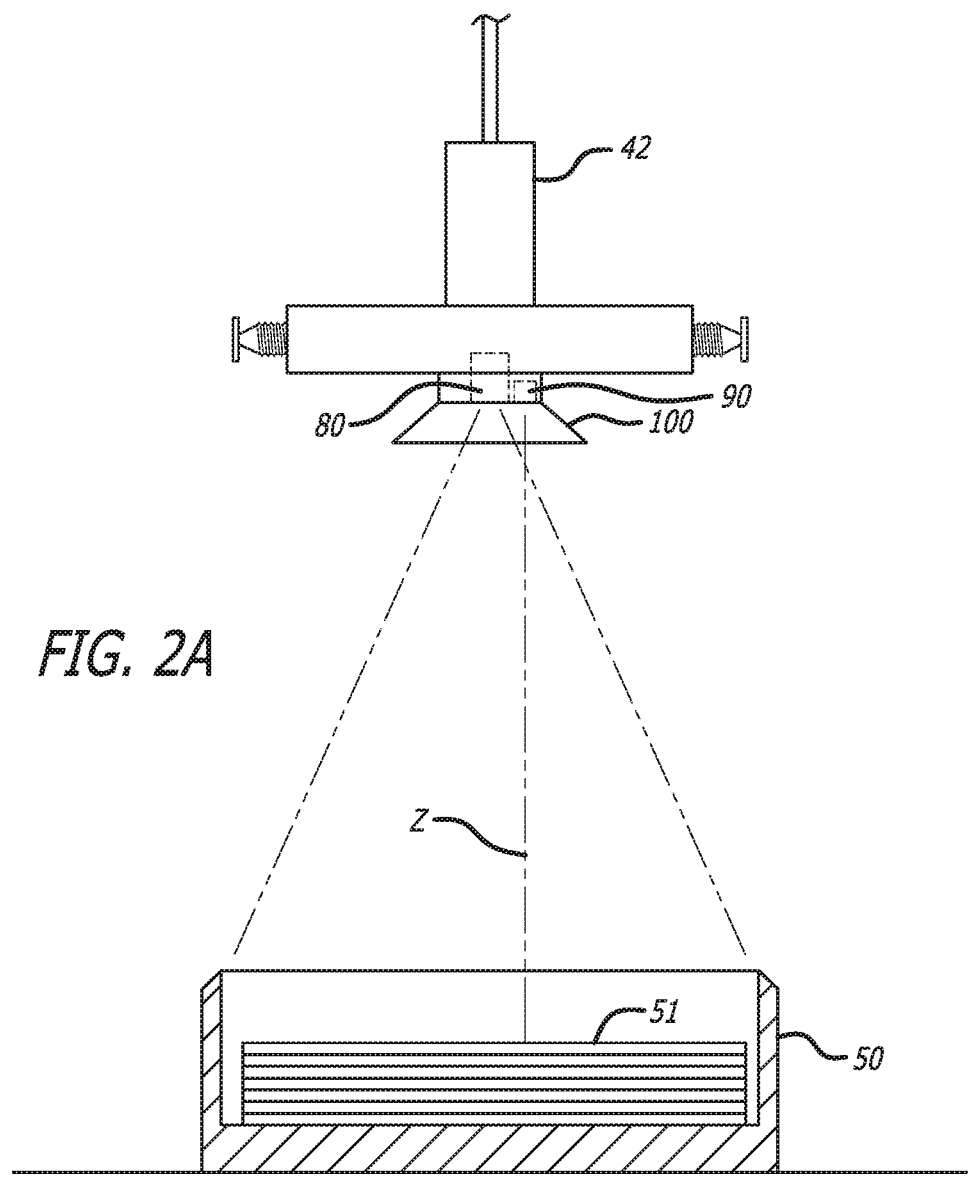
FIG. 2A is an enlarged, side view of the pick-up device and camera combination using a vacuum pick-up device.
Figure 2B:
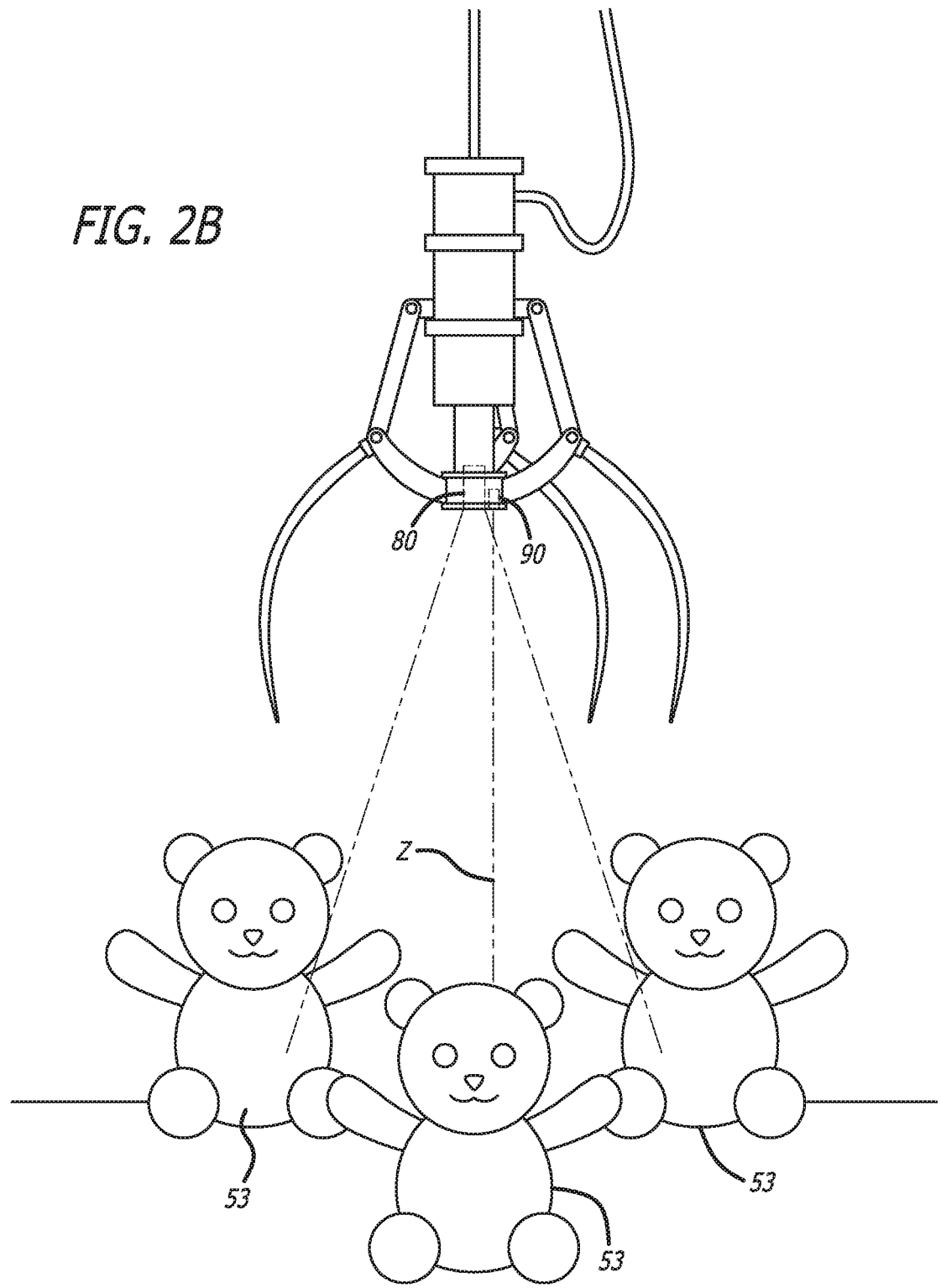
FIG. 2B is an enlarged, side view of the pick-up device and camera combination using a mechanical claw pick-up device.

FIGS. 2A and 2B illustrate two different pick-up devices that can be used with the present invention. The pick-up device of FIG. 2A is a vacuum type pick-up device that is used to pick-up cards 51 and other smooth surface prizes and targets, whereas the pick-up device of FIG. 2B is a mechanical claw device that is used to pick up plush animals 53, soft or hard targets, and prizes that can be grasped with a claw. Each pick-up device is equipped with a camera 80 that projects a field about the targets from which an optical image can be collected. This image can be delivered to the display 70 using conventional means, including wired, wireless, and other modes of data transmission or to a portable device or remote device for future viewing.

The pick-up device can also be equipped with a sensor 90 for detecting a proximity with an object, i.e., a range finder. The sensor 90 can evaluate the distance from the pick-up device to the target and relay this information to the display 70 along with the image from the camera 80. This combination not only gives the player two pieces of valuable information previously unavailable to prior crane game players, but can be formatted to appear like a military screen that is favored by many younger players. That is, the combination of video information plus digital information in the form of distance to target data similar to military weaponry is attractive to some players and can add to the appeal of the game.

Figure 3C:
FIG. 3C is an illustration of another display message to the player after a successful attempt to pick up a target.
Figure 3D:
FIG. 3D is an illustration of a display message to the player after an unsuccessful attempt to pick up a target.

FIG. 3A illustrates a sample display 70 while the game is being played. The display 70 shows the silo 50 and the uppermost target 51 as the pick-up device descends from above. A bullseye 105 is projected on the target 51, and readings in the lower right hand corner yield distances to the target in the X, Y, and Z directions. Each measurement can be evaluated by the sensor 90 and the positioning mechanics of the pick-up device in the X-Y plane. Using this information, the player can maneuver the pick-up device 42 precisely over the target 51 and collect the prize with greater precision. The data 110 changes in real time as the pick-up device moves both laterally and vertically, so that the player has instantaneous feedback on the relationship between the pick-up device and the target/prize. Once the target is acquired or lost, the display 70 can show a message to the player such as "GREAT SHOT" (FIG. 3B), "YOU'RE A WINNER" (FIG. 3C), and "SORRY, TRY AGAIN" (FIG. 3D).

Figure 4:
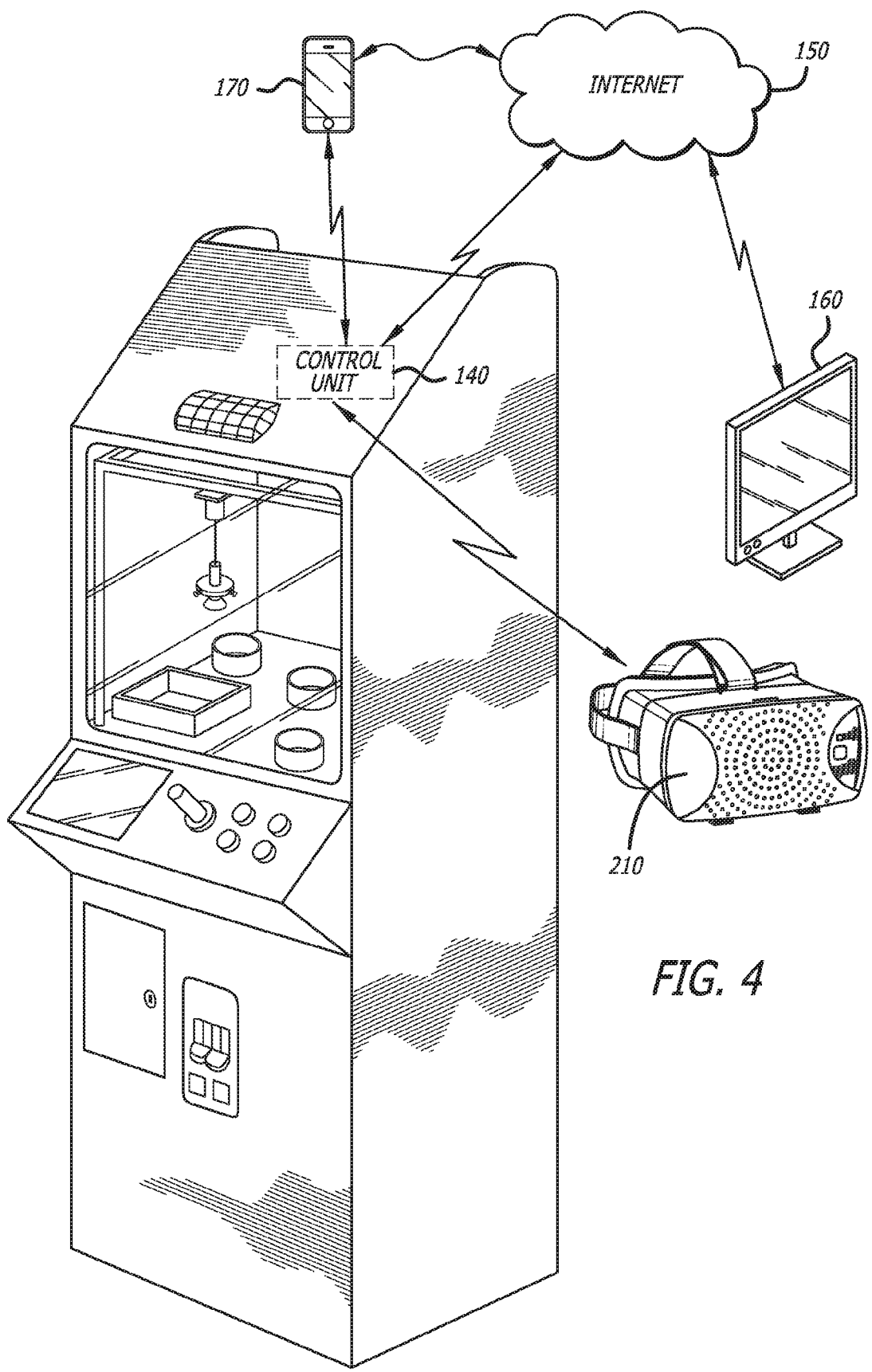
FIG. 4 is an elevated, perspective view of an embodiment where video signals from the camera are sent to a remote computer.

FIG. 4 illustrates a second embodiment of the present invention in which the video image from the camera 70 is relayed from a control unit 140 to the internet 150 where it can be seen by a remote computer 160. The image can also be seen on a mobile device such as a smart phone 170, which may be local or remote from the game itself. In this way, friends can share in the excitement and participate in the experience of playing the game with the player, and watch the game being played at a later time on the remote computer as well.

Figure 5A:
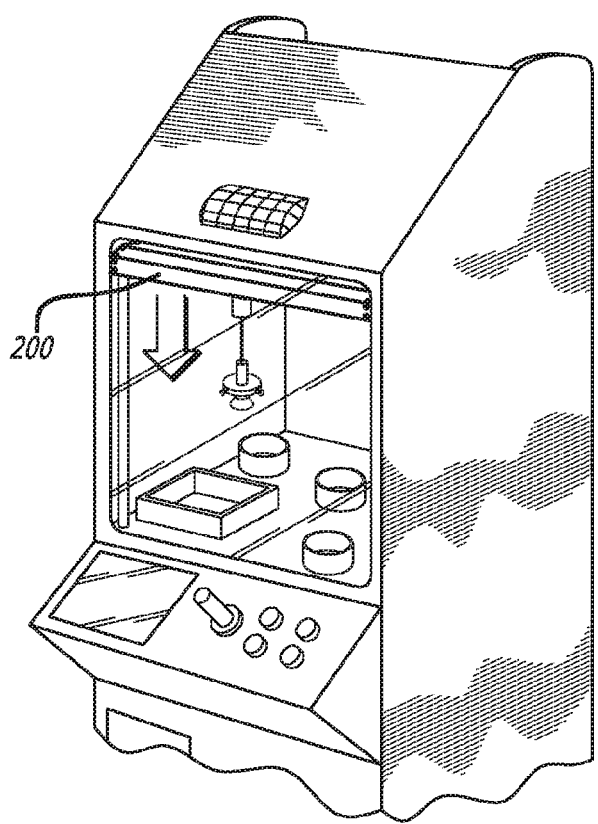
FIG. 5A is a second embodiment of the present invention showing a curtain.
Figure 5B:
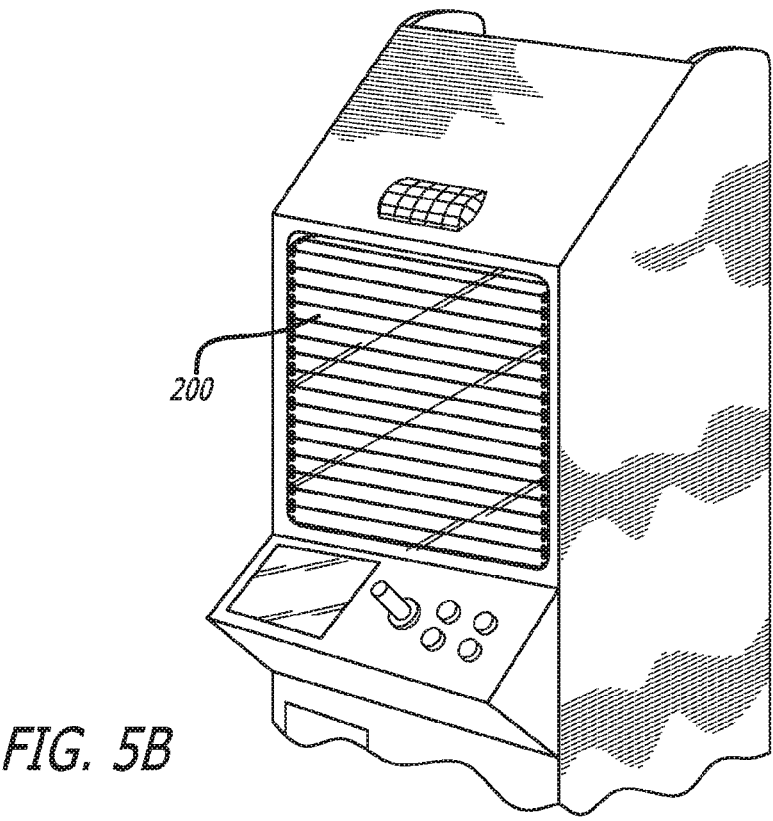
FIG. 5B is a perspective view of the embodiment of FIG. 5A with the curtain closed.

FIG. 5 illustrates a second embodiment of the present invention, where the arcade game is played solely by tactile response and by video feed. The player's view of the playing area 18 is completely occluded by a movable screen 200 that preferably comes down once the game begins. The player may wear a wireless headset 210 (FIG. 4) that includes a video feed from the camera 80, or the player may view the monitor 70 for following the action as previously described. The inside of the playing area is preferably illuminated with a light 220, which may be a strobe light or black light for visual effect. Once the movable screen 200 is down, the player's only visual clues to control the crane 42 (or other elements of the arcade game) is through the video feed via the headset 210 or monitor 70 and the tactile feedback through the joystick 25.

In this way, the player cannot simply view the game through the glass window but must control the game via the video feed, adding to the technical feel of the game. The game can further be altered by adjusting the way the video feed is presented to the player. For example, the video feed can be manipulated to invert the image to increase the difficulty of the game, or provide an intermittent video signal that is two seconds on and two seconds off. The video feed could also be altered by using an eccentric lens (e.g., a video distortion unit 295) to give the effect of a funhouse mirror to the video feed, making the game more challenging and at the same time making each game unique.

The tactile feedback can be enhanced as well, such that the joystick can be connected to a oscillating unit 290 that increases in power as the sensor 90 determines that the pick-up device 100 is approaching a target 51. Thus, the player "feels" when the target is coming into acquisition range by the increased vibration of the joystick as a result of the oscillator. The combination of the tactile response with the visual feedback through the monitor to an actual mechanical process, as opposed to a digital program, is not known in the gaming art.

Figure 6:
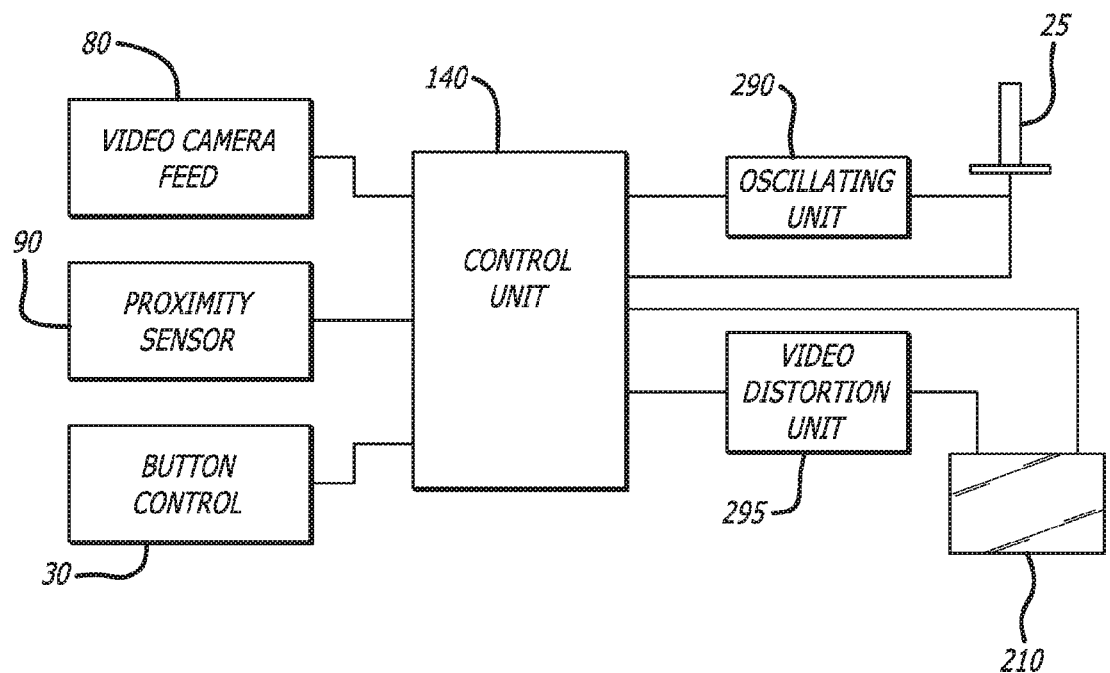
FIG. 6 is a schematic diagram of the embodiment of FIG. 5.

FIG. 6 illustrates the input to the control unit 140, including the video camera 80, the proximity sensor 90, and the button control 30. The oscillating unit 290 is controlled by the control unit to provide feedback to the player through the joystick 25, and the video distortion unit 295 can alter the video feed to the player to adjust the visual perception of the player through the headset to increase the difficulty of the game as well.

The foregoing description is not intended to be limiting or exclusive, but rather is intended only to be illustrative of the present invention. One of ordinary skill in the art will readily recognize variations and modifications to the foregoing descriptions and depictions, and the invention is intended to include all such variations and modifications. Accordingly, the invention is not confined by anything in the foregoing description or drawings unless expressly stated, but rather the scope of the invention is determined by the appended claims using their plain and ordinary meanings.

I claim:

1. An arcade game having a housing and player controls for maneuvering a pick-up device selected to pick up targets within the housing, comprising:
    a movable barrier for obstructing a view of the game's interior once game play begins;
    a camera mounted inside the game's interior for capturing real time video of a game play as the pick-up device is maneuvered;

a display for displaying game play from the camera to allow a player to view a target from a camera's perspective while attempting to pick-up a target;

whereby a player must rely on the real time image from the camera to manage the pick-up device.

2. The arcade game of claim 1, wherein the display is a wireless headset worn by the player.

3. The arcade game of claim 2, further comprising a tactile response on the player controls for providing tactile feedback to the player on a condition of the pick-up device.

4. The arcade game of claim 2, wherein the pick-up device is a mechanical claw.

5. The arcade game of claim 2, wherein the pick-up device is a vacuum device.

6. The arcade game of claim 2, further comprising a strobe light for intermittently lighting a playing area during game play.

7. The arcade game of claim 2, wherein the real time image of the camera is distorted to vary a difficulty of the game.

8. The arcade game of claim 7, wherein the distortion is that the image is inverted.

9. The arcade game of claim 7, wherein the distortion is that the image is intermittently displayed.

* * * * *